(12) United States Patent
Ciulis et al.

(10) Patent No.: US 7,520,708 B2
(45) Date of Patent: Apr. 21, 2009

(54) SEALING PLUG WITH REINFORCED STEM

(75) Inventors: Marek Ciulis, Poznan (PL); Henry R. DeGraan, Poway, CA (US)

(73) Assignee: Aztec Washer Company, Poway, CA (US)

( * ) Notice: Subject to any disclaimer, the term of this patent is extended or adjusted under 35 U.S.C. 154(b) by 288 days.

(21) Appl. No.: 11/486,420

(22) Filed: Jul. 13, 2006

(65) Prior Publication Data

US 2008/0038078 A1 Feb. 14, 2008

(51) Int. Cl.
*B60P 7/12* (2006.01)
(52) U.S. Cl. .......................................... 411/34; 411/38
(58) Field of Classification Search ................ 411/34, 411/38, 43, 901, 902; 114/227; 220/235; 215/360
See application file for complete search history.

(56) References Cited

U.S. PATENT DOCUMENTS

| | | | | |
|---|---|---|---|---|
| 408,364 | A * | 8/1889 | Traut | 215/359 |
| 1,212,871 | A * | 1/1917 | Abbott | 215/359 |
| 2,929,237 | A | 3/1960 | Lancer | |
| 3,017,800 | A | 1/1962 | Cohen | |
| 3,021,927 | A | 2/1962 | McKee, Jr. | |
| 3,388,212 | A | 6/1968 | Nichols et al. | |
| 4,108,043 | A * | 8/1978 | Varga | 411/34 |
| 4,572,708 | A | 2/1986 | Fischer | |
| 4,574,544 | A | 3/1986 | Harris, Sr. | |
| 4,901,395 | A | 2/1990 | Semrau | |
| 4,906,148 | A * | 3/1990 | Schule | 411/34 |
| 5,080,542 | A | 1/1992 | Sheahan | |
| 5,161,916 | A * | 11/1992 | White et al. | 405/259.6 |
| 5,193,326 | A | 3/1993 | Sheahan | |
| 6,161,998 | A | 12/2000 | Brown | |
| 6,224,309 | B1 * | 5/2001 | Yamamoto | 411/11 |
| 6,273,655 | B1 * | 8/2001 | McAlpine et al. | 411/34 |
| 6,607,087 | B2 * | 8/2003 | Turnwald | 215/360 |
| 6,901,628 | B2 | 6/2005 | Cerul | |
| 2005/0238456 | A1 | 10/2005 | Stinson | |

OTHER PUBLICATIONS

Internet printout describing Master Plug®, "http://www.aztecwasher.com/masterplug.htm," 2 pages, prior to Nov. 14, 2005.

* cited by examiner

*Primary Examiner*—Gary Estremsky
(74) *Attorney, Agent, or Firm*—Knobbe, Martens, Olson & Bear, LLP (57) ABSTRACT

A device for sealing an opening in a structural member and/or for sealing a plurality of openings in overlapping members, or for hanging an object on a wall. The device includes a deformable member having a substantially cylindrical stem and a flange at a first end of the stem. In some embodiments the deformable member is constructed of a compressible material that has good sealing capabilities. The stem is configured to extend through at least one opening in the at least one structural member such that the flange abuts a surface of the structural member. A reinforcing sleeve extends around the stem and provides a protective barrier between the at least one structural member and the stem. The sleeve may be constructed of a relatively hard and durable material such as a polymer, a metal or a ceramic. In some embodiments the sleeve is substantially cylindrical with at least one tab extending from a lower end thereof. In some other embodiments the sleeve includes a flange at an upper end. The device has additional utility as a fastening member for securing objects to surfaces.

14 Claims, 6 Drawing Sheets

SEALING PLUG WITH REINFORCED STEM

BACKGROUND OF THE INVENTION

1. Field of the Invention

The present invention relates to hardware for fastening structural members together, for securing objects to structural members, and/or for sealing openings in structural members.

2. Description of the Related Art

Figure 1:
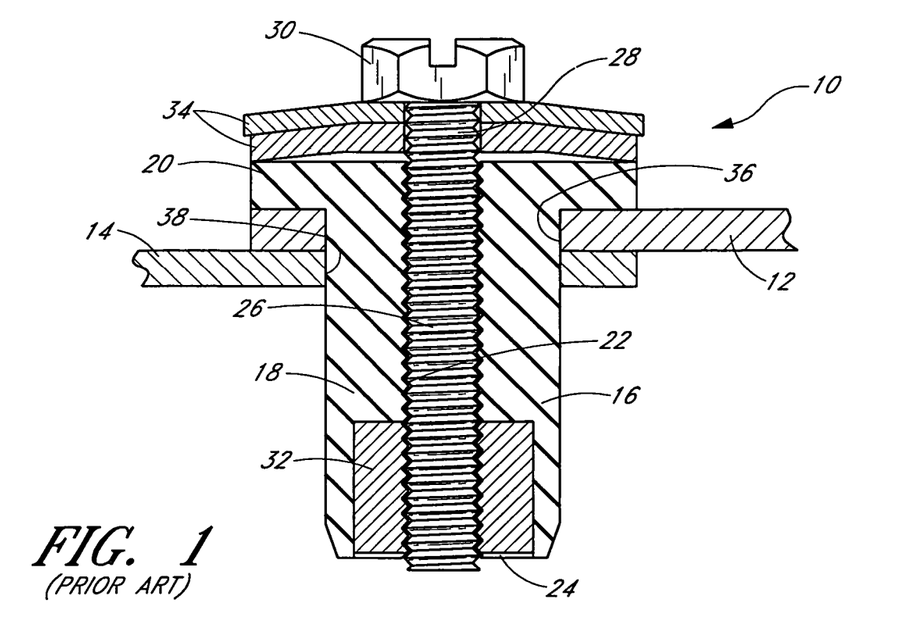
FIG. 1 is a side elevational cross-sectional view of a prior art sealing plug, illustrating the plug in a pre-tightening configuration disposed within first and second holes in first and second panels, respectively.

FIG. 1 illustrates a prior art sealing plug 10 that may be used to fasten together a first panel 12 and a second panel 14, and to seal openings in the panels 12, 14. For example, roofs or side walls of certain structures include a plurality of sheet metal or polymeric panels that are arranged in rows. Adjacent panels can be secured to one another by forming holes in overlapping portions of the panels, and then inserting one of the plugs 10 into a pair of aligned holes in the overlapping panels. The same plug 10 may also be used to seal an opening in a single panel. As used herein the term "panel" has an expansive definition, and is not limited to structural members that have a relatively small thickness dimension and relatively large height and width dimensions.

With reference to FIG. 1, the plug 10 comprises a deformable member 16 that includes a substantially cylindrical stem 18 with a substantially disc-shaped flange 20 at a first end. The stem 18 includes a through-hole 22 that passes substantially through a center of the stem 18. The stem 18 further includes a recess 24 that is centered on the through-hole 22 and located at an end of the stem 18 opposite the flange 20. The through-hole 22 receives a shank 26 of a fastening member, such as a bolt 28. The bolt 28 is aligned with the deformable member 16 such that a head 30 thereof is positioned adjacent the flange 20. The recess 24 of the stem 18 receives a nut 32, and internal threads of the nut 32 receive the external threads of the bolt 28. One or more washers 34 may be disposed between the bolt head 30 and the flange 20.

Figure 2:
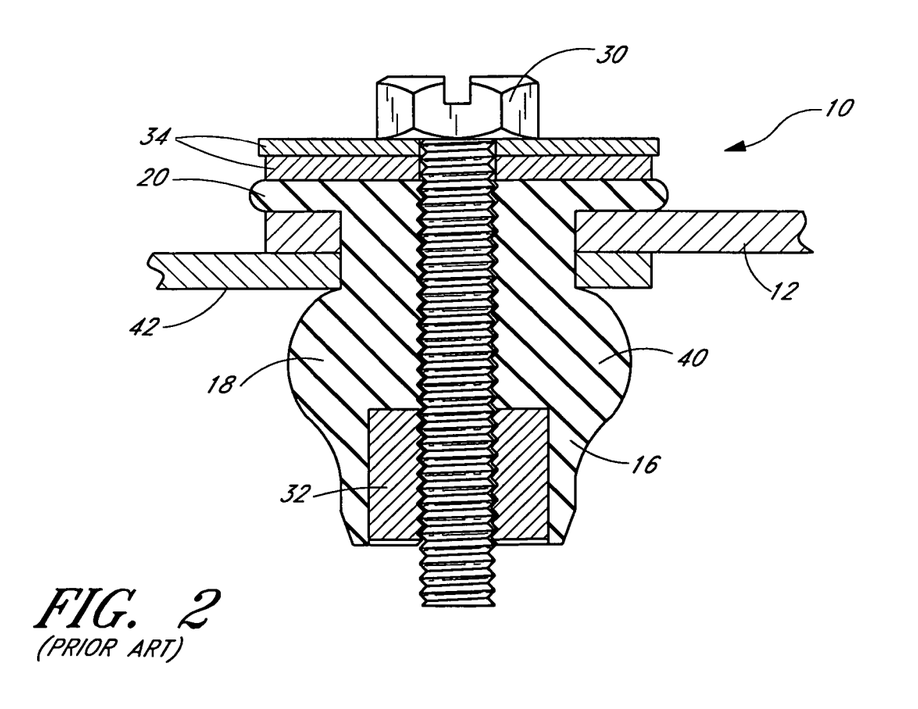
FIG. 2 is a side elevational cross-sectional view of the sealing plug and panels of FIG. 1, illustrating the plug in a post-tightening configuration.

The deformable member 16 is preferably constructed of a compressible material that has good sealing properties, such as rubber. The plug 10 is thus adapted to be inserted into an opening to seal the opening. For example, FIG. 1 illustrates the plug 10 disposed through a first opening 36 and a second opening 38 in the first and second panels 12, 14, respectively. Each of the panels 12, 14 may be sheet metal, as in the example described above. With the plug 10 disposed in the illustrated fashion, an installation professional rotates the bolt head 30, which causes the threaded portion thereof to advance through the nut 32, which in turn draws the nut 32 upward toward the bolt 28 head. As shown in FIG. 2, as the nut 32 advances the deformable member 16 is squeezed between the bolt head 30 and the nut 32. The washers 34 compress the flange 20 against the first panel 12, causing a height of the flange 20 to decrease and causing edges of the flange 20 to bulge outwardly. The nut 32 compresses the stem 18, causing the stem 18 to bulge outwardly. The bulging creates a mushroom-shaped head 40 that presses against a lower surface 42 of the second panel 14. The compression provided by the bolt 28, nut 32, washers 34 and the deformable member 16 holds the panels 12, 14 together and seals out moisture.

When a plug 10 such as the one illustrated in FIGS. 1 and 2 is used to fasten overlapping panels of sheet metal together, the sheet metal tends to expand and contract as the ambient temperature fluctuates. As the sheet metal expands, the openings 36, 38 through which the plug 10 extends become smaller and tend to cut through the relatively soft material of the deformable member 16. This interaction of the expanding and contracting sheet metal with the plug material disadvantageously shortens the lifespan of the plug 10.

SUMMARY OF THE INVENTION

The preferred embodiments of the present sealing plug have several features, no single one of which is solely responsible for their desirable attributes. Without limiting the scope of this sealing plug as expressed by the claims that follow, its more prominent features will now be discussed briefly. After considering this discussion, and particularly after reading the section entitled "Detailed Description of the Preferred Embodiments," one will understand how the features of the preferred embodiments provide advantages, which include a longer lifespan as compared to sealing plugs without reinforced portions, and increased pull-out strength.

One embodiment of the present sealing plug comprises a sealing plug for sealing an opening in at least one structural member, the structural member having a thickness. The sealing plug comprises a deformable member including a substantially cylindrical stem and a flange at a first end of the stem. A through-hole extends through the stem. A second end of the stem includes a recess. A nut is disposed within the recess. The sealing plug further comprises a fastening member having a head and a shank. The shank is received within the through-hole such that the head is positioned adjacent the flange. At least one washer is positioned between the head and the flange. A reinforcing sleeve is disposed around the stem. A length of the sleeve is equal to or greater than the thickness of the structural member.

BRIEF DESCRIPTION OF THE DRAWINGS

The preferred embodiments of the present sealing plug, illustrating its features, will now be discussed in detail. These embodiments depict the novel and non-obvious sealing plug shown in the accompanying drawings, which are for illustrative purposes only. These drawings include the following figures, in which like numerals indicate like parts.

DETAILED DESCRIPTION OF THE PREFERRED EMBODIMENTS

Figure 3:
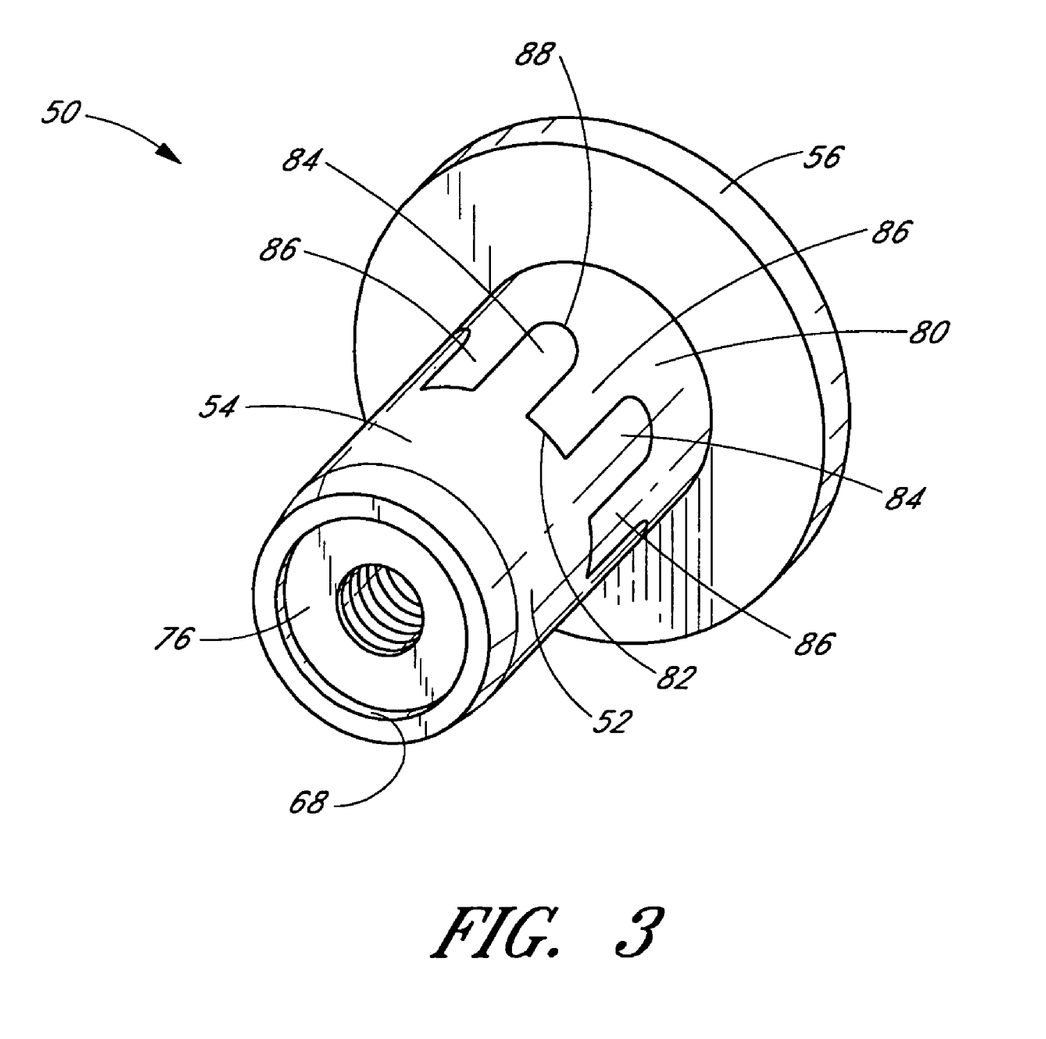
FIG. 3 is a lower perspective view of one embodiment of the present sealing plug with reinforced stem.
Figure 4:
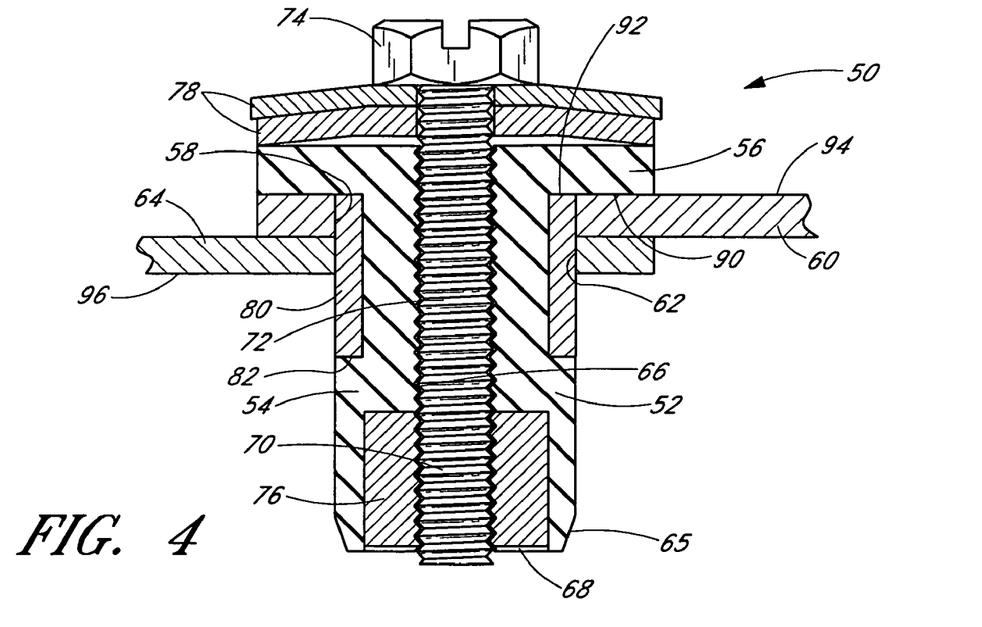
FIG. 4 is a side elevational cross-sectional view of the sealing plug of FIG. 3, illustrating the plug in a pre-tightening configuration disposed within first and second holes in first and second panels, respectively.
Figure 5:
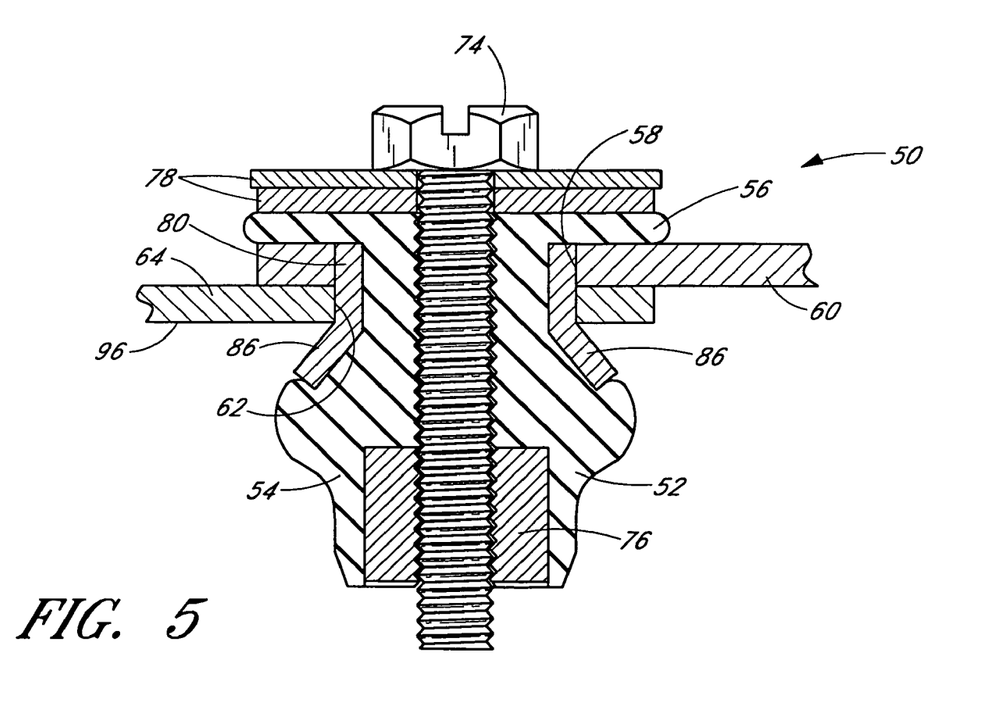
FIG. 5 is a side elevational cross-sectional view of the sealing plug and panels of FIG. 4, illustrating the plug in a post-tightening configuration.

FIGS. 3-5 illustrate one embodiment of the present sealing plug 50 with reinforced stem 54. The plug 50 comprises a deformable member 52 that may be constructed of a compressible material having good sealing properties, such as rubber or any of a variety of compressible polymers. In the illustrated embodiment, the deformable member 52 comprises a substantially cylindrical stem 54 with a substantially disc-shaped flange 56 at a first end. With reference to FIG. 4, the stem 54 is adapted to extend through a first opening 58 in a first panel 60 and a second opening 62 in a second panel 64 to hold the panels 60, 64 together and to seal out moisture. As with the sealing plug 10 described above, the plug 50 is also useful for sealing holes in a single structural member. In the illustrated embodiment, a lower end of the stem 54 includes a chamfer 65 that helps to guide the stem 54 into the hole(s) during an installation procedure. Those of skill in the art will appreciate, however, that the stem 54 need not include a chamfer 65.

The stem 54 includes a through-hole 66 that passes substantially through a center of the stem 54. The stem 54 further includes a recess 68 that is centered on the through-hole 66 and located at an end of the stem 54 opposite the flange 56. The through-hole 66 receives a shank 70 of a fastening member, such as a bolt 72. The bolt 72 is aligned with the deformable member 52 such that a head 74 of the bolt 72 is positioned adjacent the flange 56. The recess 68 of the stem 54 receives a nut 76. The nut 76 may alternatively be carried by the threaded shank 70 beyond the end of the stem 54, without being disposed within a recess 68. In the illustrated embodiment, a perimeter of the recess 68 is round (FIG. 3), and the nut 76 has a complementary shape that fits snugly within the recess 68. Those of skill in the art will appreciate that the recess 68 and the nut 76 could be of virtually any shape, including square, hexagonal or octagonal. Preferably, however, the nut 76 and the recess 68 have complementary shapes so that the nut 76 seats snugly within the recess 68. The nut 76 may, for example, be insert molded with the deformable member 52. The snug engagement of these components prevents rotation of the nut 76 within the recess 68 as an installer turns the bolt head 74, as described in more detail below. Internal threads of the nut 76 receive the external threads of the bolt 72. One or more washers 78 may be disposed between the bolt head 74 and the flange 56.

The plug 50 further includes a reinforcing sleeve 80 that extends around the stem 54 adjacent the flange 56. The sleeve 80 may be constructed of a durable material, such as a metal, a polymer or a ceramic, such that the sleeve 80 forms a sturdy barrier between the panels 60, 64 and the relatively soft material of the deformable member 52. The sleeve 80 thus protects the deformable member 52 from being damaged by the expanding and contracting panels 60, 64. The sleeve 80 may, for example, be insert molded with the deformable member 52, positioned within an annular recess on the deformable member 52 as a post molding assembly step, or slipped concentrically over the deformable member 52 without fitting into an annular recess.

With reference to FIG. 3, at least an annular, upper zone of the sleeve 80 is shaped substantially as a cylinder. A lower edge 82 of the cylinder includes a plurality of cut-out portions 84 and a plurality of axially extending ribbons or tabs 86, with each tab 86 being disposed between neighboring cut-out portions 84. As those of skill in the art will appreciate, the term "cut-out" as used herein does not imply that the sleeve 80 is formed through any particular process. For example, the sleeve 80 could be cast as a regular cylinder and then portions of the cylinder corresponding to the cut-out portions 84 could be removed through machining, stamping, laser cutting or other technique. However, the sleeve 80 could also be cast in the illustrated shape. The cut out portions may alternatively be in the form of a plurality of axially extending slits which extend axially from the lower edge.

In the illustrated embodiment, each of the cut-out portions 84 is of uniform size and shape, and each of the tabs 86 is of uniform size and shape. Further, in the illustrated embodiment approximately six cut-out portions 84 and six tabs 86 are provided. However, as those of ordinary skill in the art will appreciate, any number of tabs 86 and cut-out portions 84 may be provided, and neither the cut-out portions 84 nor the tabs 86 need necessarily be of uniform size and shape. In the illustrated embodiment, an upper limit 88 of each of the cut-out portions 84 is substantially arcuate. However, those of skill in the art will appreciate that each upper limit 88 could be straight, or any other shape.

In the illustrated embodiment, the outside diameter of the sleeve 80 is approximately equal to the outside diameter of the stem 54, so that the outer surfaces of these two components are flush with one another. However, those of ordinary skill in the art will appreciate that the outer surfaces need not be flush with one another.

FIG. 4 illustrates the plug 50 disposed through a first opening 58 in a first panel 60 and a second opening 62 in a second panel 64. Each of the panels 60, 64 may be sheet metal, or any other material. A lower surface 90 of the flange 56 abuts the first panel 60, and edges of each opening 58, 62 abut the sleeve 80. Those of skill in the art will appreciate that the openings 58, 62 may be of larger diameter than the sleeve 80, such that a gap separates the openings 58, 62 from the sleeve 80. In the illustrated embodiment, an upper extent 92 of the sleeve 80 is substantially flush with an upper surface 94 of the first panel 60, and the lower end 82 of the sleeve 80 extends beneath a lower surface 96 of the second panel 64. The axial length of the sleeve 80 may be approximately equal to the expected sum of the thicknesses of the panels to be joined. In certain embodiments, a length of the sleeve 80 may be greater than a thickness of the first and second panels 60, 64 combined. For example, if the thickness of the first and second panels 60, 64 combined equals x, then a length of the sleeve 80 may be at least about 1.25x, 1.5x, 1.75x, 2x, or more.

With the plug 50 disposed in the illustrated fashion, an installation professional rotates the bolt head 74, which causes the threaded portion thereof to advance through the nut 76, which in turn draws the nut 76 upward toward the bolt head 74. As illustrated in FIG. 5, as the nut 76 advances, the deformable member 52 is squeezed between the bolt head 74 and the nut 76. The washers 78 compress the flange 56 against the first panel 60, causing a height of the flange 56 to decrease and causing edges of the flange 56 to bulge outwardly. The nut 76 compresses the stem 54, causing the stem 54 to bulge outwardly. The bulging stem 54 pushes against interior surfaces of the tabs 86, causing the stem 54 to bulge out between neighboring tabs 86 and causing the tabs 86 to bend outwardly and upwardly. The lower surface 96 of the second panel 64 constrains the tabs 86, such that the tabs 86 bend at the point where they meet the lower surface 96. The bulging stem 54 and the bending tabs 86 press against the lower surface 96. The compression provided by the bolt 72, nut 76, washers 78 and the deformable member 52 holds the panels 60, 64 together and seals out moisture.

As described above, the protective sleeve 80 acts as a barrier between the relatively sharp edges of the apertures through panels 60, 64 and the relatively soft deformable member 52. Thus, for example if the panels 60, 64 are constructed of a metal that expands when heated, as the ambient temperature rises the openings 58, 62 in the panels become smaller or are biased out of alignment and squeeze the sleeve 80. The protective sleeve 80 prevents the expanding panels 60, 64 from cutting into the relatively soft stem 54. In embodiments where the length of the sleeve 80 is greater than the thickness of the first and second panels 60, 64 combined, the sleeve 80 may prevent most if not all contact between the panels 60, 64 and the stem 54. The stem 54 is thus less vulnerable to being damaged by the expanding panels.

The dimensions of the sealing plug in accordance with the present invention may be varied widely, and will be governed by the intended application. For example, panels 60 and 64 commonly used in industry each may have a thickness within the range of from about 0.032" to about 0.125". In certain common applications, the thickness of the panels 60 and 64 is about 0.062". The diameter of the aperture is generally in the range of from about 0.375" to about 0.750", and the outside diameter of the sleeve 80 is preferably at least about 0.005" smaller than the inside diameter of the aperture.

The axial length of the sleeve 80 is preferably at least as long as the sum of the thicknesses of the panels to be joined, although a shorter axial length may in some instances be desirable, depending upon the desired performance characteristics. In general, however, the axial length of the sleeve 80 will be greater than the sum of the thicknesses of the panels to be joined.

The sleeve 80 may be constructed out of any of a variety of materials. In one embodiment, the sleeve is formed from stainless steel, carbon steel or tempered aluminum, and has a wall thickness of within the range of from about 0.015" to about 0.032".

Figure 6:
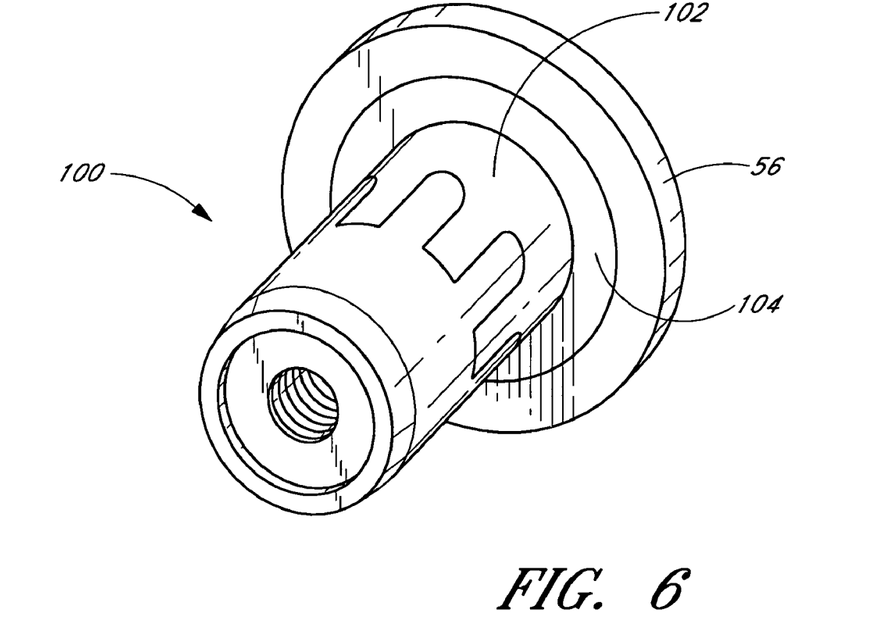
FIG. 6 is a lower perspective view of another embodiment of the present sealing plug with reinforced stem.
Figure 7:
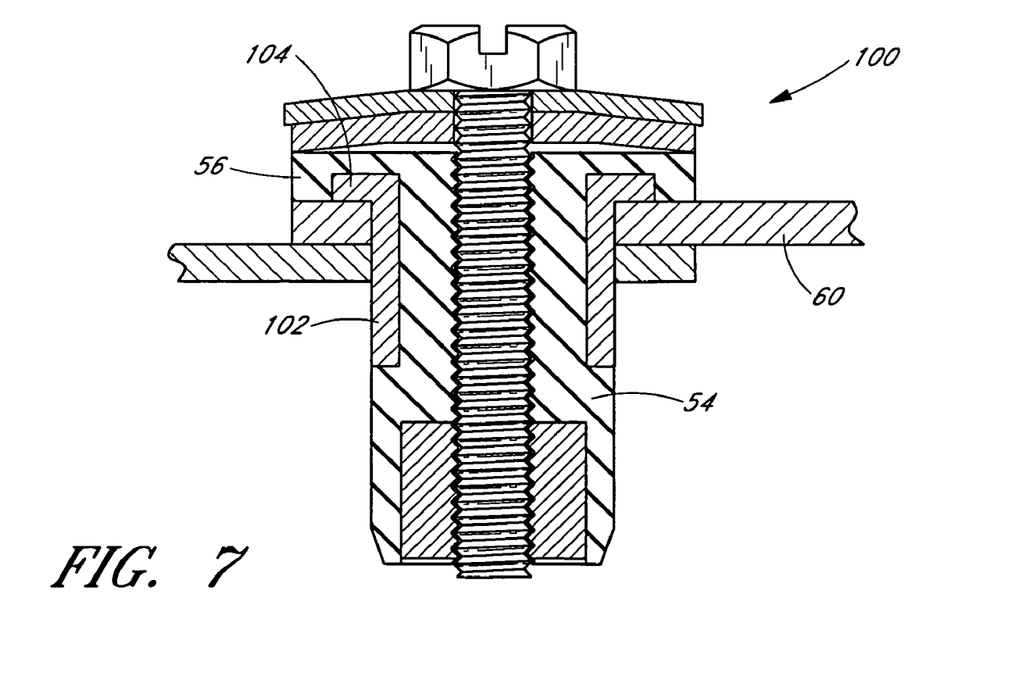
FIG. 7 is a side elevational cross-sectional view of the sealing plug of FIG. 6, illustrating the plug in a pre-tightening configuration disposed within first and second holes in first and second panels, respectively.

FIGS. 6 and 7 illustrate another embodiment of the present sealing plug. The plug 100 of FIGS. 6 and 7 is substantially identical to the plug 50 illustrated in FIGS. 3-5, except that the sleeve 102 includes a radially outwardly extending flange 104 at an upper end thereof. In the illustrated embodiment, the flange 104 extends about halfway to the outer edge of the flange 56. However, the flange 104 may extend any length from the sleeve 102 to the edge of the flange 56 and beyond. In the illustrated embodiment, the flange 104 has approximately the same thickness as the substantially cylindrical portion of the sleeve 100. However, as those of skill in the art will appreciate, the flange 104 may have any thickness relative to the substantially cylindrical portion of the sleeve 100.

As FIG. 7 illustrates, the flange 104 creates an additional barrier between the first panel 60 and the stem 54. The stem 54 is thus less vulnerable to being damaged by the expanding first panel 60.

For manufacturing convenience, the illustrated sealing plug includes a protective element in the form of an annular sleeve 80 or 102. However, alternative protective barriers may also be used, for positioning between the edges of the aperture in the panels to be joined and the expandable stem 54. For example, 2 or 3 or 4 or more axially extending elements such as metal rails or curved plates may be positioned about the circumference of the stem 54, with or without being directly connected to each other. This may be accomplished by positioning the protective elements in the mold, prior to molding the stem 54, or adhering the protective elements to the stem using adhesives, thermal bonding or other attachment technique. The barrier may also be formed by wrapping a ribbon of material such as a metal foil around the stem as a post molding step. As a further alternative, the axially extending strips or tabs 86 may be configured to allow a relatively greater lateral flexibility at the free end, compared to the end attached to the annular zone of sleeve 80. This may be accomplished by progressively reducing the wall thickness or circumferential arc length of each of the tabs in the direction of the free end. Any of a variety of additional modifications may be utilized, such as rounding or chamfering sharp edges, to minimize the extent of impingement into the bulging stem 54 which is impingement illustrated schematically, for example, in FIG. 5.

Figure 8:
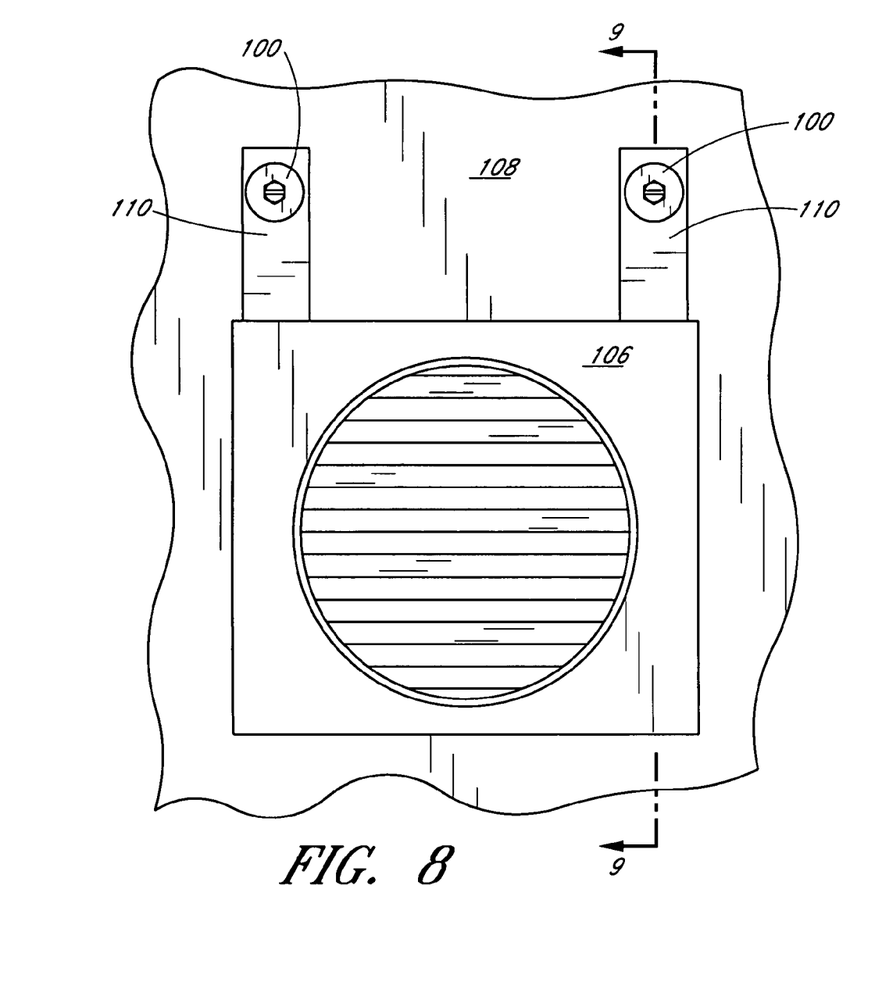
FIG. 8 is a front elevational view of an air conditioning unit secured to a wall using two of the sealing plug of FIG. 3.
Figure 9:
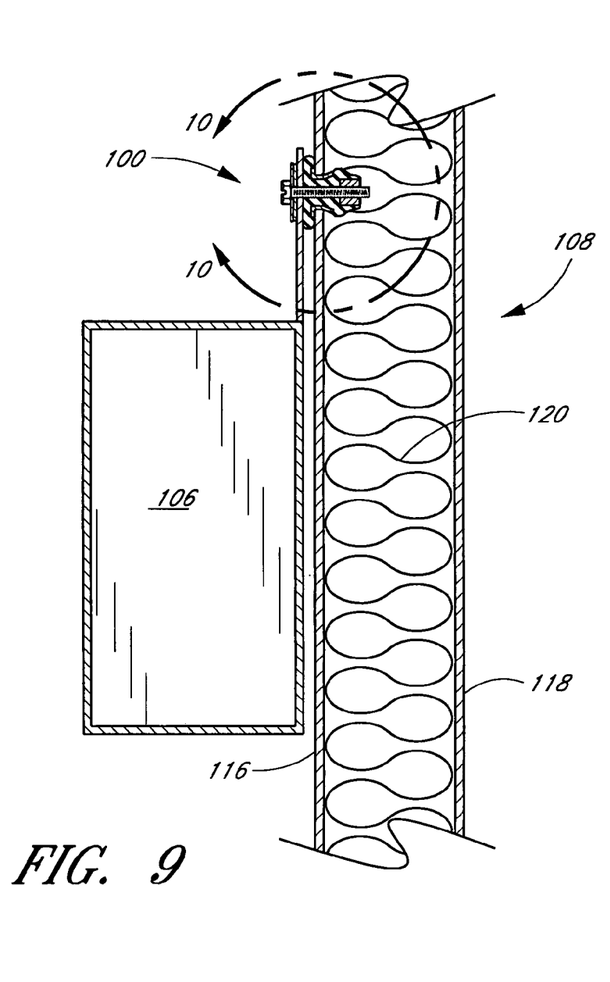
FIG. 9 is a right-side elevational cross-sectional view of the air conditioning unit, the wall and one of the sealing plugs of FIG. 8 taken along the line 9-9 in FIG. 8.
Figure 10:
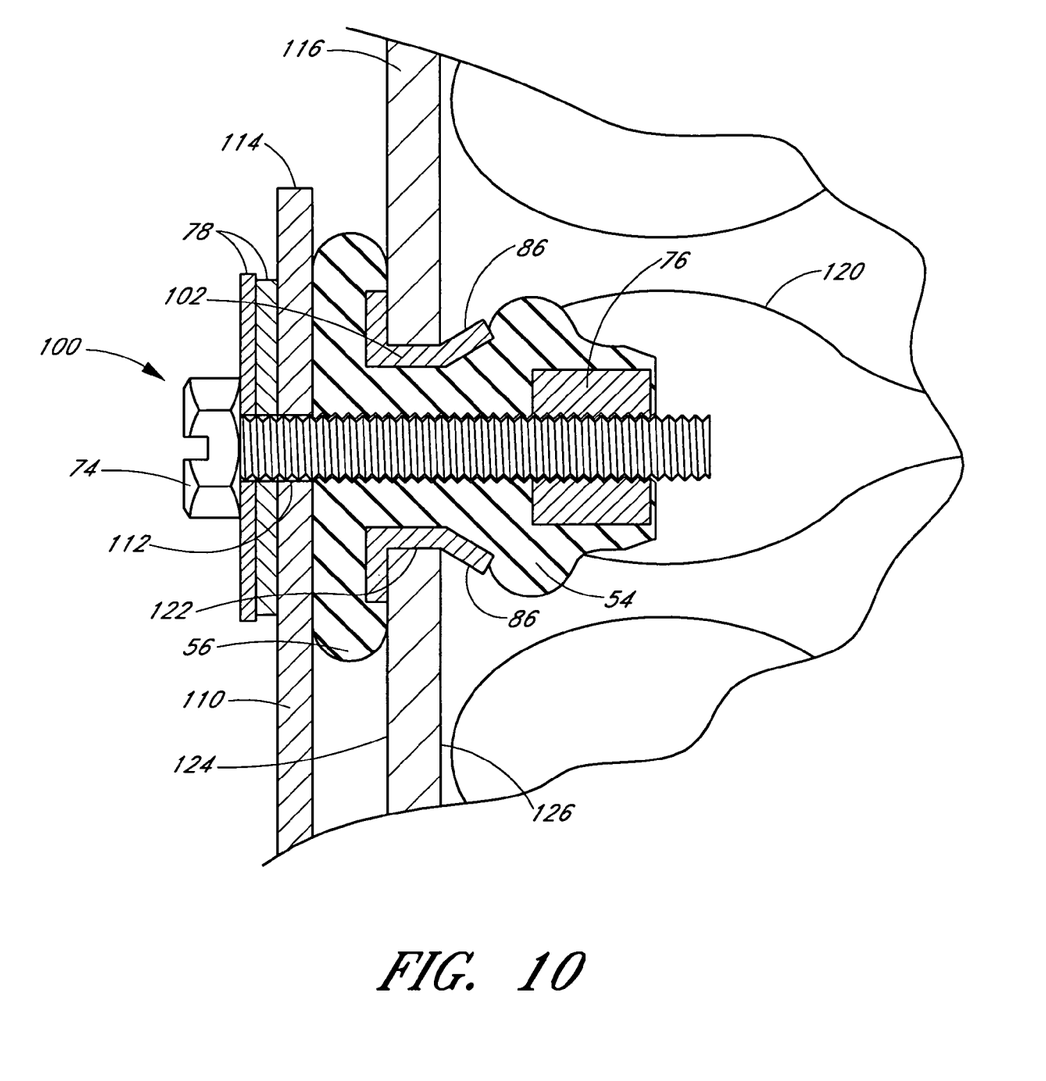
FIG. 10 is a detail cross-sectional view of the wall and the sealing plug of FIG. 9 indicated by the line 10-10 in FIG. 9.

FIGS. 8-10 illustrate an alternative application for the present sealing plugs 50, 100. In general, the sealing plugs of the present invention may be utilized to secure any of a variety of panels to each other or to other objects, as discussed above. Such panels may comprise sheet metal, fiberglass, plastic, glass, sandwich panels or others as will apparent to those of skill in the art. In addition, the sealing plugs of the present invention may be utilized to secure any of a wide variety of objects to a panel or other wall or structure. Such objects may include any of a wide variety of equipment such as air conditioning units, heating units, fans, pumps, fuse boxes, electrical panels, and other equipment as will be apparent to those of skill in the art. In addition, objects such as pipes, electrical conduits, signs, shelving, frames and other objects may be secured to a panel or other wall utilizing the sealing plugs of the present invention.

With reference to FIGS. 8 and 9, a first sealing plug 100 and a second sealing plug 100 secure a piece of equipment such as an air conditioning unit 106 to a wall 108. The A/C unit 106 includes first and second mounting brackets 110 that extend upwardly from the unit. In the illustrated embodiment, each mounting bracket 110 is shaped substantially as a flat rectangular plate including an aperture 112 (FIG. 10) near an upper end 114. Those of skill in the art will appreciate that the illustrated A/C unit and mounting brackets are merely examples, and that the present sealing plugs 50, 100 could be used to secure virtually anything to any surface, whether using mounting brackets or not.

With reference to FIGS. 9 and 10, each sealing plug 100 extends through the aperture 112 in its respective mounting bracket 110 and into the wall 108. In the illustrated embodiment, the wall 108 comprises a sandwich panel. However, those of skill in the art will appreciate that the plug 100 could be used to secure objects to virtually any type of wall. The illustrated sandwich panel includes a first exterior panel 116 and a second exterior panel 118 spaced from the first panel 116. A space between the exterior panels 116, 118 may contain insulation 120 and/or reinforcing members (not shown), or may be empty. Examples of insulation materials include polyurethane and high-density mineral wool.

Sandwich panels such as the one illustrated are frequently used to insulate controlled-temperature spaces. To mount an object to such a sandwich panel, prior art methods have included the use of long panel screws that extend through both exterior panels. Such screws disadvantageously create cold bridges from one side of the panel to the other. The cold bridge generates condensation on the warmer side of the panel, which is not only aesthetically displeasing, but can also damage the panel and/or the object mounted on the panel.

With reference to FIG. 10, in the illustrated embodiment the mounting bracket 110 is positioned between one or more washers 78 and the flange 56 of the deformable member 52, and the first panel 116 is positioned on the opposite side of the flange 56 from the mounting bracket 110. The plug 100 extends into the space between the first and second panels 116, 118, but does not extend to the second panel 118. Thus, the plug 100 does not create a cold bridge between the first and second panels 116, 118. Similarly to the installation method described above, the plug 100 is installed in the first panel 116 by first passing the stem 54 through an aperture 122 in the panel 116, and then tightening the bolt 72. The threaded portion of the bolt 72 advances through the nut 76, which in turn draws the nut 76 upward toward the bolt head 74. As the nut 76 moves closer to the bolt head 74, the bolt head 74, washers 78 and mounting bracket 110 compress the flange 56 against an exterior surface 124 of the first panel 116, while the stem 54 bulges outwardly. The compression causes a height of the flange 56 to decrease, and causes edges of the flange 56 to bulge outwardly. The bulging stem 54 pushes against interior surfaces of the tabs 86, causing the stem 54 to bulge out between neighboring tabs 86 and causing the tabs 86 to bend outwardly. An interior surface 126 of the first panel constrains the tabs 86, such that the tabs 86 bend at the point where they meet the interior surface 126. The compression generated by the bolt 72 and nut 76 holds the mounting bracket 110 to the first panel 116 and seals the aperture 122 in the panel 116 against moisture penetration. The reinforcing sleeve 102 advantageously increases the pull-out strength of the plug 100 as compared to prior art plugs having no reinforced portions, as well as reduces the risk that the first panel 116 might cut into or through the soft stem 54. The plug 100, or a plurality of plugs 100, can thus be used to mount heavy objects to support surfaces, such as vertical walls.

SCOPE OF THE INVENTION

The above presents a description of the best mode contemplated for carrying out the present sealing plug, and of the manner and process of making and using it, in such full, clear, concise, and exact terms as to enable any person skilled in the art to which it pertains to make and use this sealing plug. This sealing plug is, however, susceptible to modifications and alternate constructions from that discussed above that are fully equivalent. Consequently, this sealing plug is not limited to the particular embodiments disclosed. On the contrary, this sealing plug covers all modifications and alternate constructions coming within the spirit and scope of the sealing plug as generally expressed by the following claims, which particularly point out and distinctly claim the subject matter of the sealing plug. Those of ordinary skill in the art will appreciate that in the figures the relative dimensions of the component parts are merely one example, and not limiting.

What is claimed is:

1. A sealing plug for sealing an opening in at least one structural member, the structural member having a thickness, comprising:
    a deformable member including a substantially cylindrical stem having a through-hole therein and a flange at a first end of the stem, a second end of the stem including a recess;
    a nut disposed within the recess;
    a fastening member having a head and a shank, the shank being received within the through-hole such that the head is positioned adjacent the flange;
    at least one washer positioned between the head and the flange; and
    a substantially cylindrical reinforcing sleeve disposed around the stem, for protecting the stem from damage from edges of the opening in the structural member;
    wherein the reinforcing sleeve includes a plurality of tabs, with each pair of neighboring tabs being separated by a circumferential space.

2. The sealing plug of claim 1, wherein the structural member is a first structural member having a first thickness, and the sealing plug is configured to seal the first opening in the first structural member and a second opening in a second structural member having a second thickness, and the length of the sleeve is approximately equal to or greater than a sum of the first thickness and the second thickness.

3. The sealing plug of claim 2, wherein the length of the sleeve approximately is equal to or greater than 1.5 times the sum.

4. The sealing plug of claim 1, wherein the tabs are evenly spaced from one another.

5. The sealing plug of claim 1, wherein the plug is adapted to assume a sealing configuration in which the nut is advanced along the shank toward the head, the stem is bulged outward, and the at least one tab is bent upward and outward.

6. The sealing plug of claim 1, wherein the deformable member is constructed of a compressible material.

7. The sealing plug of claim 1, wherein the reinforcing sleeve is constructed of at least one of a metal, a polymer and a ceramic.

8. A sealing plug for sealing an opening in at least one structural member, the structural member having a thickness, comprising:
    a deformable member including a substantially cylindrical stem having a through-hole therein and a flange at a first end of the stem, a second end of the stem including a recess;
    a nut disposed within the recess;
    a fastening member having a head and a shank, the shank being received within the through-hole such that the head is positioned adjacent the flange;
    at least one washer positioned between the head and the flange; and
    a substantially cylindrical reinforcing sleeve disposed around the stem, for protecting the stem from damage from edges of the opening in the structural member and including at least one tab extending from a first end thereof;
    wherein the plug is adapted to assume a sealing configuration in which the nut is advanced along the shank toward the head, the stem is bulged outward, and the at least one tab is bent upward and outward.

9. The sealing plug of claim 8, wherein the structural member is a first structural member having a first thickness, and the sealing plug is configured to seal the first opening in the first structural member and a second opening in a second structural member having a second thickness, and the length of the sleeve is approximately equal to or greater than a sum of the first thickness and the second thickness.

10. The sealing plug of claim 9, wherein the length of the sleeve approximately is equal to or greater than 1.5 times the sum.

11. The sealing plug of claim 8, wherein the reinforcing sleeve includes a plurality of tabs, with each pair of neighboring tabs being separated by a circumferential space.

12. The sealing plug of claim 11, wherein the tabs are evenly spaced from one another.

13. The sealing plug of claim 8, wherein the deformable member is constructed of a compressible material.

14. The sealing plug of claim 8, wherein the reinforcing sleeve is constructed of at least one of a metal, a polymer and a ceramic.

* * * * *